United States Patent [19]

Madsen

[11] Patent Number: 5,304,362
[45] Date of Patent: Apr. 19, 1994

[54] METHOD IN CLEANING FLUE GAS IN A PFBC PLANT INCLUDING A GAS TURBINE DRIVEN THEREBY

[75] Inventor: Peder Madsen, Västerås, Sweden

[73] Assignee: ABB Carbon AB, Finspang, Sweden

[21] Appl. No.: 858,977

[22] PCT Filed: Nov. 20, 1990

[86] PCT No.: PCT/SE90/00755
§ 371 Date: Jul. 16, 1992
§ 102(e) Date: Jul. 16, 1992

[87] PCT Pub. No.: WO91/07219
PCT Pub. Date: May 30, 1991

[30] Foreign Application Priority Data

Nov. 20, 1989 [SE] Sweden .................... 8903891

[51] Int. Cl.$^5$ .................... B01J 8/00; C01B 17/00
[52] U.S. Cl. .................... 423/239.1; 423/235
[58] Field of Search .................... 423/239, 235, 239 A, 423/235 D, 239.1

[56] References Cited

U.S. PATENT DOCUMENTS

| | | | |
|---|---|---|---|
| 4,393,031 | 7/1985 | Henke | 423/239 |
| 4,473,536 | 12/1984 | Carberg et al. | 423/239 |
| 4,473,537 | 12/1984 | Ford et al. | 423/239 |
| 4,737,345 | 4/1988 | Henke | 422/109 |
| 5,132,103 | 7/1992 | Schoubye | 423/239 |

FOREIGN PATENT DOCUMENTS 3721051 1/1989 Fed. Rep. of Germany .
9009228 8/1990 PCT Int'l Appl. .

Primary Examiner—Gregory A. Heller
Attorney, Agent, or Firm—Joseph C. Mason, Jr.; Ronald E. Smith

[57] ABSTRACT

The invention refers to a method in cleaning flue gas in a PFBC plant including a gas turbine driven thereby, wherein the reduction of the NO$_x$ content in the flue gas is accomplished by thermal reduction by injecting ammonia into the flue gas flow to the gas turbine and then accomplished catalytically entailed reduction in the presence of ammonia in the flue gas flow from the gas turbine.

2 Claims, 1 Drawing Sheet

METHOD IN CLEANING FLUE GAS IN A PFBC PLANT INCLUDING A GAS TURBINE DRIVEN THEREBY

The invention refers to a method in cleaning flue gas in a PFBC plant including a gas turbine driven thereby, the term PFBC plant referring to a boiler with a pressurized fluidized bed or several such beds and, if necessary, a cyclone separator and/or filter for cleaning the flue gas from the boiler before such gas being supplied to the gas turbine.

In order to reduce emission of $NO_x$ in the combustion, it is known to apply a process known as thermal reduction, wherein ammonia or another nitrogen containing substance, or a nitrogen generating substance is supplied to the flue gas within the boiler itself. When henceforth ammonia is mentioned, it is intended to include therein also such substances that contain or generate ammonia or nitrogen when supplied to the hot flue gas. The supply of ammonia can be obtained in a differentiated manner by supplying the ammonia to a number of different sites in the boiler and adjusting the amount of ammonia at each site to the amount of $NO_x$ which occurs in different zones in the boiler. It also happens that the ammonia is injected into the flue gas downstream of the boiler in a separate reaction vessel, in which flue gas and ammonia are mixed intimately in order to interreact. In order to obtain a high $NO_x$ reduction, ammonia is supplied in a greater amount than that corresponding to the stoichiometric ratio, which may cause escape of unreacted ammonia with the flue gas, what is called "slip", specific measures having to be taken in order to render the surplus ammonia harmless before the flue gas is released to the atmosphere, which, of course, is a disadvantage and involves enhanced capital costs. Another and more obvious disadvantage in connection with a PFBC plant is, however, that by supplying ammonia the thermal reduction of $NO_x$ in the boiler becomes unacceptably low or even non-existent at too low partial loads due to the low temperature of the gas from the boiler.

Another known way of reducing $NO_x$ in the flue gas is the catalytic reduction, ammonia being supplied downstream of the boiler and the mixture of flue gas and ammonia being contacted with a catalyst e.g. vanadin. The catalyst does not participate in the reaction between flue gas and ammonia but must, nevertheless, from time to time be replaced or exchanged, which adds to the operating costs of the plant.

In order to obtain a reduction of $NO_x$ in the flue gas, which is advantageous as to capital and operating economy, to an acceptable value in a plant of the type referred to above over a large range of partial load of the PFBC plant without unacceptable "slip" being obtained, the method proposed according to the invention has obtained the characteristics specified in claim 1. Then a smaller amount of catalyst can be used than if the total reduction of $NO_x$ would be effected by catalytic reduction since the catalyst needs to be dimensioned only for catalytic reduction to the smaller extent that is required in order to obtain a satisfactory $NO_x$ reduction also at low partial loads, the catalyst at the same time providing the supplementary reduction that may be necessary for consumption of possible surplus of ammonia leaving the boiler, because at that site it has not had the opportunity to react with present $NO_x$. Due to the unique combination of thermal and catalytical reduction in a plant of the kind referred to herein it is possible to achieve totally a $NO_x$ reduction without release of unpermitted amounts of unreacted ammonia, which are lower than the demands presently stipulated.

BRIEF DESCRIPTION OF THE DRAWINGS

In order to further explain the invention, the accompanying drawing is referred to, on which FIG. 1 diagrammatically shows a PFBC plant with a turbine driven thereby.

Figure 1:
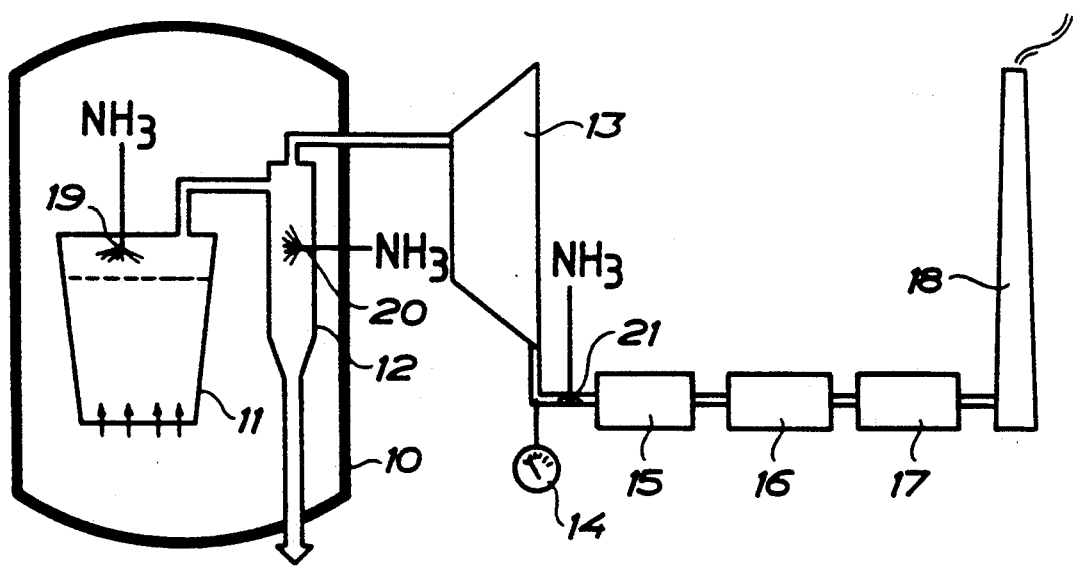

The plant according to FIG. 1 comprises a PFBC plant with a pressure vessel 10, in which a boiler 11 is located, said boiler having one or several fluidized beds for combustion of particulate solid fuel. In the pressure vessel a cyclone separator 12 (or several such separators) is also arranged for separation of dust from the flue gas which leaves the boiler before the flue gas being supplied to a gas turbine 13. Downstream of the turbine an instrument 14 is located for indication of the $NO_x$ content in the flue gas which leaves the turbine, and then a catalyst 15 follows for intensification of the reaction between $NO_x$ and ammonia in order to permit this to proceed at a lower temperature than is the case without catalyst. From the catalyst, the flue gas escapes via an economizer 16 and a flue gas filter 17 to a funnel 18 for release to the atmosphere.

In order to reduce the $NO_x$ present in the flue gas resulting from the combustion in the boiler 11, ammonia ($NH_3$) is injected into the boiler in the free board above the fluidized gas bed at 19 and/or in the cyclone separator 12 arranged as a mixing vessel at 20 and, if required in dependece on the $NO_x$ content indicated on the instrument 14, at a site 21 in the flow of flue gas immediately upstream of the catalyst 15. In the boiler, the injection of ammonia is distributed to different zones of the boiler depending on the calculated amount of $NO_x$ present in the individual zones, the ammonia preferably being supplied above the stoichiometric ratio. Then, a supplementary injection can be made at 19 and/or 20, if required considering the indication on the instrument 14. The reduction of $NO_x$ proceeds by thermal reduction both in the boiler and in the cyclone separator.

Figure 2:
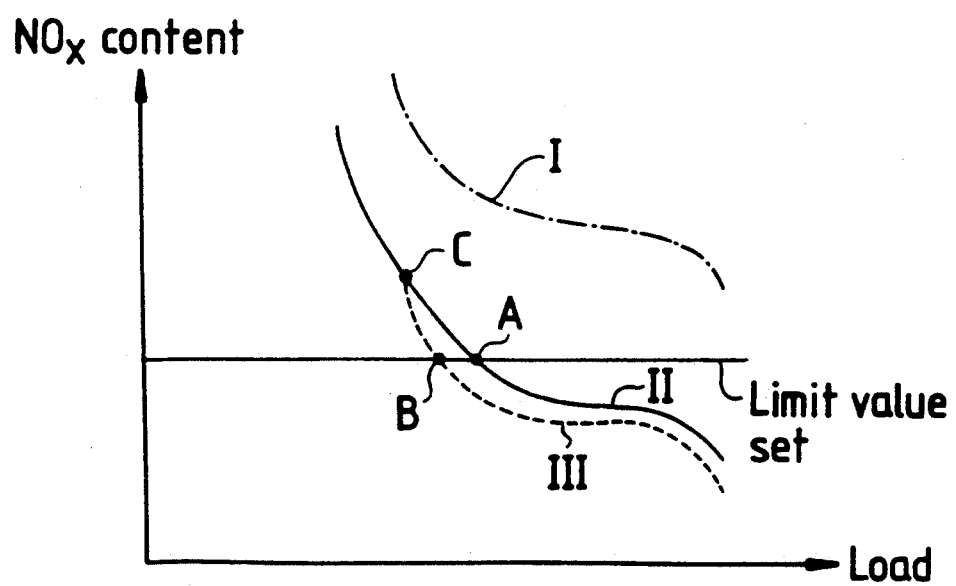
FIG. 2 is a diagram illustrating the relationship between the $NO_x$ content in the flue gas and the load of the PFBC plant.

FIG. 2 shows as an example (relating to a specific plant heated by a specific fuel) the $NO_x$ content obtained in the flue gas by a dot-and-dash line I, if no $NO_x$ reduction is applied at all, and it is evident that the $NO_x$ content then is considerably higher than a presumed limit value for the $NO_x$ content in the flue gas released to the atmosphere. If only thermal $NO_x$ reduction had been applied, the solid line II would have been obtained, and it is evident that the $NO_x$ content then will pass the limit value at the point A as a consequence of the flue gas temperature at this point being so low that the effect of the ammonia injection drastically decreases.

By providing a catalytic reduction downstream of the gas turbine in the catalyst 15 a further decrease of the $NO_x$ content to the broken curve III will be obtained. This decrease can be accomplished solely by the injection of ammonia that is effected at the sites 19 and/or 20, but if the injected amount of ammonia already has reacted with the flue gas, further amounts of ammonia can be injected into the flue gas at 21, if this is considered necessary by guidance of the indication of the $NO_x$ content on the instrument 14. It is evident that a satisfactory $NO_x$ reduction is obtained at lower partial loads since the curve does not pass the limit value until the point B and the $NO_x$ content over the total load range is considerably lower than according to the curve II. At the point C, but not earlier, the $NO_x$ content reaches the same value as the content according to the curve II and at this point the catalyst ceases to function because the flue gas temperature is too low.

Since the thermal reduction of $NO_x$ functions over a broader temperature interval in a PFBC plant than in a combustion plant at atmospheric pressure the capacity of the catalytic reduction does not have to be especially large in order to obtain a marked expansion of the load range in which the $NO_x$ content can be held under the presumed limit value.

I claim:

1. Method for removing $NO_x$ from flue gas of a pressurized boiler from a PFBC plant having a gas turbine associated with the plant which consists essentially of:
   (a) combusting a particulate solid fuel in a pressurized boiler of a PFBC plant thereby producing flue gas containing $NO_x$;
   (b) obtaining flue gas which contains $NO_x$ from a PFBC plant pressurized boiler in continuous manner;
   (c) injecting ammonia into the flue gas at a point within the pressurized boiler;
   (d) passing the flue gas containing ammonia and $NO_x$ into a gas turbine;
   (e) subjecting the flue gas exhausted from the gas turbine to an injection of additional ammonia whereby the $NO_x$ content of the flue gas is reduced by thermal reduction; and
   (f) passing the flue gas exhausted from the gas turbine into a catalytic reduction zone whereby the $NO_x$ content of the flue gas is further reduced by catalytic action
   (g) measuring the $NO_x$ content of the flue gas at a point downstream from the gas turbine; and,
   (h) controlling the amount of ammonia being injected into the flue gas flow in the pressurized boiler and the amount of ammonia being injected in the exhausted flue gas from the gas turbine in dependence upon the measured amount of $NO_x$.

2. Method of removing $NO_x$ from the flue gas generated in a pressurized gas producer vessel which consists essentially of:
   (a) combusting a particulate solid fuel in a pressurized boiler of a PFBC plant thereby producing flue gas containing $NO_x$;
   (b) obtaining flue gas which contains $NO_x$ from a pressurized combustion vessel in continuous flow therefrom;
   (c) injecting ammonia into such flue gas flow at a point within the pressurized vessel;
   (d) passing the flue gas containing ammonia and $NO_x$ into a gas turbine;
   (e) subjecting the exhaust flue gas from the gas turbine to an injection of additional ammonia whereby the $NO_x$ content of the flue gas is reduced by thermal reduction;
   (f) measuring an amount of $NO_x$ in the exhaust flue gas from the turbine at a point in the gas flow which is upstream from the injection point for the additional ammonia;
   (g) controlling the amount of ammonia being injected into the gas flow prior to the turbine and the amount of ammonia being injected into the exhaust flue gas from the turbine in dependence upon the measured amount of $NO_x$;
   (h) introducing the exhaust flue gas from the turbine into a catalytic reduction zone whereby the $NO_x$ content of the flue gas is further reduced; and,
   (i) expelling the flue gas from the catalytic reaction zone for release to the atmosphere.

* * * * *